March 25, 1969 E. J. NALLIN 3,435,440

NULL SWEEPING HEAD

Filed Jan. 4, 1965 Sheet 1 of 2

INVENTOR
EUGENE J. NALLIN
BY James E. Murray
ATTORNEY

March 25, 1969 E. J. NALLIN 3,435,440

NULL SWEEPING HEAD

Filed Jan. 4, 1965 Sheet 2 of 2

United States Patent Office 3,435,440

Patented Mar. 25, 1969

3,435,440
NULL SWEEPING HEAD

Eugene J. Nallin, Poughkeepsie, N.Y., assignor to International Business Machines Corporation, New York, N.Y., a corporation of New York Filed Jan. 4, 1965, Ser. No. 423,103
Int. Cl. G11b *5/24;* G01d *15/12*
U.S. Cl. 340—174.1 9 Claims

ABSTRACT OF THE DISCLOSURE

The specification discloses a magnetic recording head having a non-magnetic gap and a coil which are magnetically linked through arms of magnetic material. Pole pieces extend out from between the arms and the gap on both sides of the gap for the application of magnetic fields to saturate the magnetic arms and thus isolate the gap from the coil. These pole pieces are configured so as to go into saturation when the strength of the saturating fields exceed the strength necessary to saturate the arms. This automatically controls the magnitude of any magnetic differential across the gaps due to imbalances in the applied magnetic fields.

The present invention relates to the recording and reproducing of information on a magnetic media and more particularly to recording or reproducing heads for this purpose.

In conventional magnetic recording, information is recorded on a magnetic media, such as tape, in rows, called tracks, which are arranged parallel to the motion of the media. In the past, magnetic heads, which are commonly referred to as null sweeping heads, have been employed to record or detect signals on a magnetic media in the manner described above.

Like many other heads used to record or detect signals in a number of tracks on a magnetic media, null sweeping heads include an array of side by side electromagnetic transducers each with a gap and an electric winding joined together by a magnetic path capable of transmitting magnetic signals between the gap and the winding. However, null sweeping heads differ from other multi-transducer heads in that all the transducers of the null sweeping head are coupled by their magnetic paths to a single winding which can be used to record or detect signals with any selected one of the transducers exclusively. To accomplish this, the null sweeping head has a magnetic bias and sweep arrangement which supplies magnetomotive force to saturate the magnetic paths between the winding and the gaps of the non-selected transducers, thereby rendering all but the selected transducer incapable of transmitting magnetic signals between their gaps and the winding.

Though null sweeping heads have many well known advantages over other heads which can record or detect signals in a number of tracks on a magnetic media, the disadvantages of prior null sweeping heads have limited their use. In particular, the magnetic paths in the transducers of prior null sweeping heads do not properly saturate when they are subjected to magnetomotive force from tht magnetic bias and sweep arrangements. In some instances, these transducers do not fully saturate and allow magnetic signals to be simultaneously transmitted between the winding and the gaps of two or more transducers. In other instances, a magnetic field is produced across the gaps of the saturated transducers which is of sufficient intensity to erase data on the magnetic media.

Therefore, it is an object of the present invention to provide an improved magnetic head of the null sweeping type.

It is a further object of this invention to provide a magnetic head of the null sweeping type which minimizes the intensity of the magnetic fields across the gaps of the saturated transducers and still provides sufficient magnetic flux to these transducers to saturate the magnetic paths between their gaps and the winding.

It is a more specific object of the present invention to provide null sweeping head with transducers having variable reluctance portions which permit the magnetic paths between the winding and the gaps to saturate but which prevent significant magnetic potentials from developing across the gaps.

Other objects of the present invention are to provide a null sweeping head with reduced cross talk between the transducers, provide an operationally stable null sweeping head, and to provide a mechanically rugged null sweeping head.

The foregoing and other objects, features and advantages of the invention will be apparent from the following more particular description of a preferred embodiment of the invention as illustrated in the accompanying drawings of which:

Figure 1:
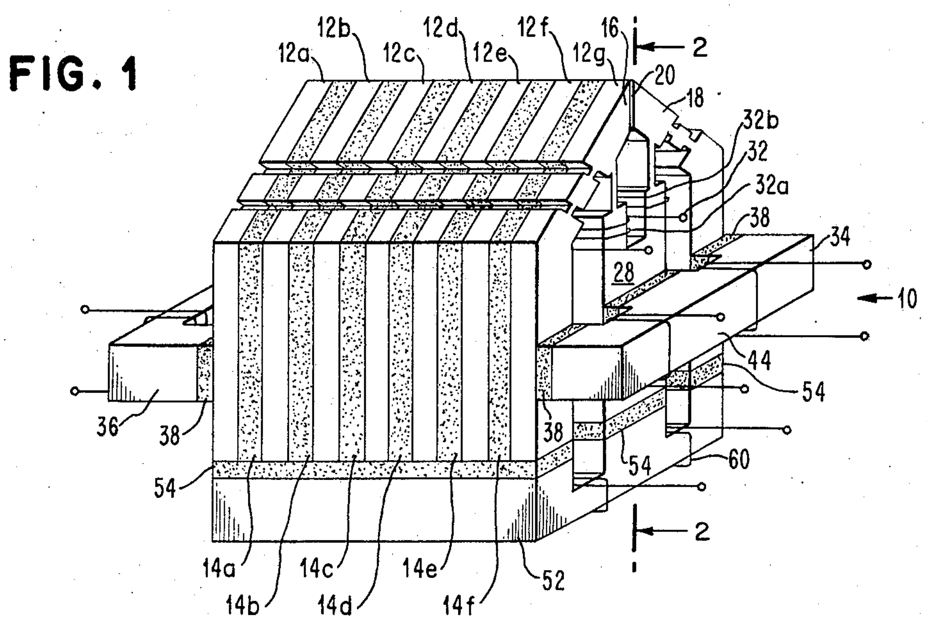
FIG. 1 is a perspective view of a null sweeping head of the present invention.
Figure 2:
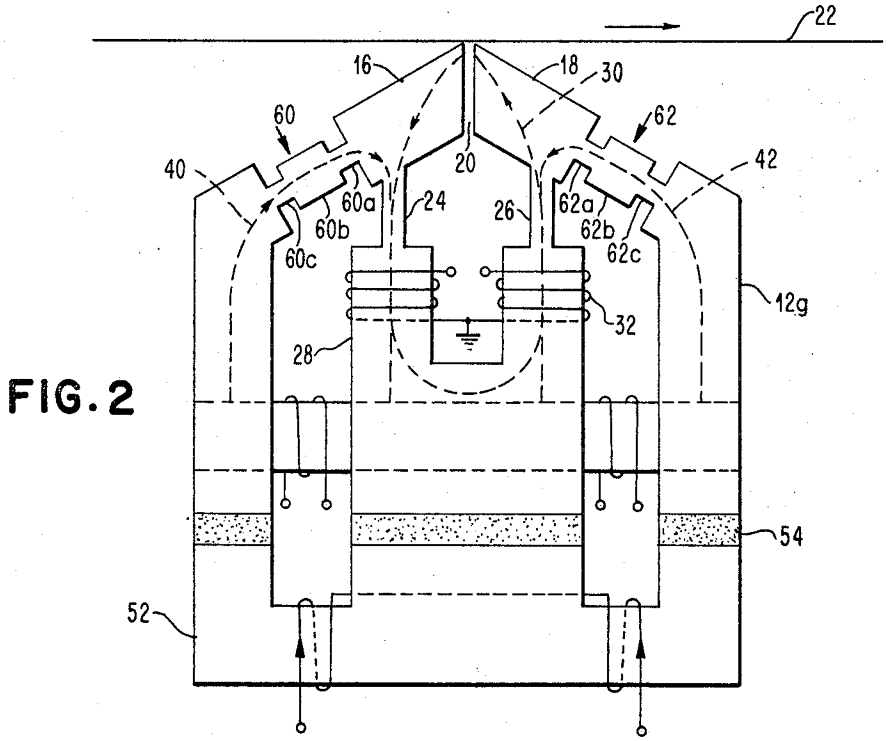
FIG. 2 is a section taken along line 2—2 in FIG. 1 to show one of the transducers of the head.

Referring to FIGS. 1 and 2, the null sweeping head 10 has an array of seven identical magnetic transducers 12*a* to 12*g* of .006 inch mu metal which are separated from each other by strips 14*a* to 14*f* of magnetically insulating material. As shown in FIG. 2, each of the transducers 12 has two magnetic pole pieces 16 and 18 separated from each other by a gap 20 for recording or detecting information on magnetic tape 22. These two pole pieces are joined together by arms 24 and 26 extending from a third pole piece 28 to form a magnetic path 30 across the gap from the first pole piece 16 to the second pole piece 18 through arm 24, the main body of the third pole piece 28, and the arm 26. This path forms the signal recording and detecting loop for the transducers. Magnetic signals produced by information recorded on the tape are transmitted from the gap 20 along the path 30 to an electrical winding 32 wrapped around the third magnetic pole piece 28 to produce electrical signals in the winding 32, and alternatively, electrical signals impressed on the winding 32 produce magnetic signals which are transmitted along the path 30 to the gap 20 to record information on the tape 22.

As is shown in FIG. 1, the single winding 32 serves as the read and write winding for each of the transducers 12*a* to 12*g*. The winding 32 is divided into two separate coils. One coil 32*a* is wrapped around the arms 24 of all the transducers and the other coil 32*b* is wrapped around the arms 26 of all the transducers. The winding 32 is center tapped to ground between the coils 32*a* and 32*b*, and the coils 32*a* and 32*b* are wound in opposite directions about each of the arms. This particular arrangement of the winding 32 is used so that equal but opposite magnetomotive forces are induced in the arms 23 and 26 when current flow is induced in the winding 32 by changes in the magnetic intensity along the path 30.

With the above described arrangement of magnetic transducers, information in the form of an electrical signal applied to the terminals of the winding 32 will be magnetically recorded on the magnetic tape 22 and data magnetically recorded on the magnetic tape 22 will appear at the terminals of the winding 32 in the form of electrical signals. To enable the recording or detecting of information exclusively with any selected one of the transducers, a bias and sweep arrangement is provided for saturating the arms 24 and 26 of the other transducers so that magnetic signals will not be transmitted between the winding 32 and the gaps of the other transducers.

The bias arrangement comprises two E-shaped magnets 34 and 36 mounted on opposite sides of the array of transducers on squares 38 of magnetically insulating material. The magnets 34 and 36 bias the first and second pole pieces 16 and 18 at one magnetic polarity and the third pole piece 28 at the other magnetic polarity. This sets up paths of magnetic flux 40 and 42 in each of the transducers 12 that pass respectively through the arms 24 and 26 between the third pole piece 28 and the first and second pole pieces 16 and 18. The two E-shaped magnets 34 and 36 are oppositely poled so that the magnetomotive force produced between the third pole piece 28 and the first and the second pole pieces 16 and 18 by the bias magnets 34 and 36 varies from a maximum of one polarity at transducer 12*a* through zero at the middle transducer 12*d* to a maximum of the other polarity at transducer 12*g*.

Figure 3:
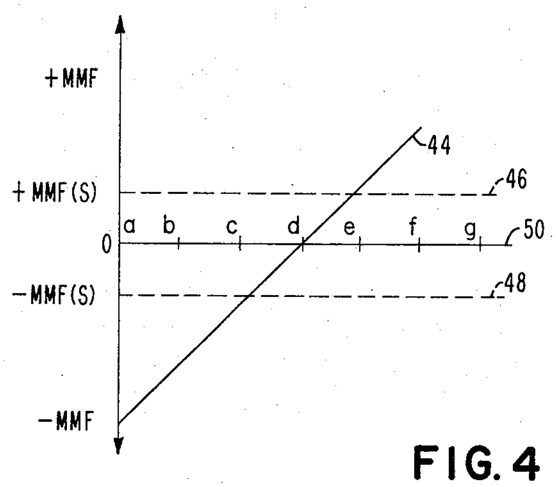
FIG. 3 is a graph illustrating how the magnetic bias is applied to the transducers.

This variation in bias mmf. is illustrated in FIG. 3 by the solid diagonal line 44. The dotted lines 46 and 48 on either side of the line 50 of zero mmf. indicate the magnitude of mmf. which must be applied between the third pole piece and the first and second pole piece of any transducer in order to saturate the arms 24 and 26 of that transducer. When the arms 24 and 26 of any particular transducer are saturated, the winding 32 is magnetically isolated from the gap 20 of that transducer. Therefore, in FIG. 3, the only transducer in the null sweeping head capable of recording or detecting signals on the magnetic tape is transducer 12*d* since it is the only transducer in which the arms 24 and 26 are not saturated.

To shift the bias zero or null point from the transducer 12*d* to one of the other transducers, an E-shaped electromagnet 52 is fixed to the bottom of the array of transducers 12. To prevent short circuiting of this E-shaped electro-magnet, spacers of magnetic insulating material 52 are positioned between the bottoms of each of the pole pieces and the electromagnet 52.

Figure 4:
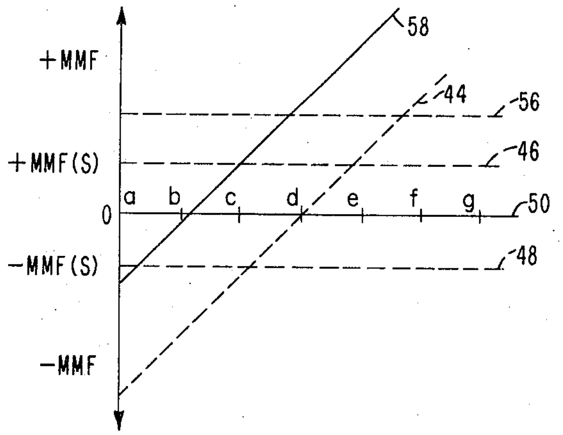
FIG. 4 is a graph illustrating how the magnetic bias is varied to enable any one transducer to record or detect information on a magnetic media.

The flux produced by the electro-magnet 52 is added or subtracted from the saturation flux provided by the bias magnets 34 and 36 and therefore will shift the zero or null point of the bias from transducer 12*d* to one of the other transducers. This is graphically illustrated in FIG. 4. In this figure, magnetomotive force represented by the dotted line 56 is impressed between the third pole piece 28 and the first and second pole pieces 16 and 18 of each of the magnetic transducers 12 by the null shifting electro-magnet 52. This mmf. 56 is added to the mmf. 44 supplied to the transducers 12 by the bias magnets 34 and 36 so that the total mmf across the transducers 12 is as is represented by the solid line 58. Thus, by the addition of the mmf. 56 from the sweep magnet 52, the null or zero has been shifted from transducer 12*d* to transducer 12*b*. This means that information can now be detected and recorded on magnetic tape by transducer 12*b* while the remainder of the transducers, including transducer 12*d*, are held inoperative by the saturation of their arms 24 and 26. In like manner, by varying the magnitude and polarity of the mmf. supplied by the null shifting electro-magnet 52, each of the transducers 12 can be made operative while the remainder of the transducers are held inoperative. Preferably, this is accamplished by applying a saw-tooth sweep voltage to the terminals of the winding 60 of the null shifting electromagnet 52 so that the null point in the saturating magnetomotive force will be shifted across the head from transducer to transducer in systematic sequence.

Because of the manner in which the null shifting electro-magnet is employed to shift the null across the head from transducer to transducer, magnetic heads of the type described above are called null sweeping heads. Null sweeping heads have been well known for some time however their use has been limited primarily because the mmf's produced by the bias and sweep circuits of prior null sweeping heads have not been properly controlled. In certain cases, these mmf's do not fully saturate the arms 24 and 26 of all transducers that are supposed to be held inoperative resulting in more than one transducer being operative at one time. In other cases, the magnetic fields of the paths 40 and 42 in the saturated transducers are sufficiently unbalanced to produce magnetic fields across the gaps which will erase information recorded on tape.

In accordance with the present invention, the transducers are designed so that they are properly saturated and have means for automatically compensating for unbalances in the flux densities of magnetic fields in the two paths 40 and 42.

Referring to FIG. 2, it can be seen that the arms 24 and 26 are the narrowest part of each transducer along the paths 40 and 42. This is to assure that other portions of the transducer will not be driven into saturation before the arms 24 and 26 and thereby limit the flux flowing in the paths 40 and 42 below that necessary to saturate the arms 24 and 26. However, it will be noted that the first and second pole pieces 16 and 18 have portions 60 and 62 with restricted cross sectional areas. These portions 60 and 62 are driven near saturation or into saturation by the amount of flux required to saturate the arms 24 and 26. Therefore, while the reluctance of these portions 60 and 62 is not great for flux in amounts less than that necessary to saturate the arms 24 and 26, it increases rapidly for flux in excess of that amount, thereby effectively limiting the magnitude of the magnetic differential that can be developed across the gap 20 after the arms 24 and 26 are saturated.

To minimize the effect of any magnetic differential that may exist, the cross sectional areas of the pole pieces 16 and 18 at the gap 20 are made quite large with respect to the cross sectional areas at the restrictions 60 and 62. However, the ratio of the areas is limited by the fact that the cross sectional area at the gap cannot be too large with respect to the cross sectional areas of the arms 24 and 26, otherwise, slight changes in magnetic flux at the gap 20 will saturate the arm portions 24 and 26 and limit the dynamic range of the transducer. A good compromise is to have the cross sectional area of the first and second pole pieces at the gap 20 between 10 and 15 times as large as the cross sectional area of the arms 24 and 26 and have the cross sectional area of the restricted portions 60 and 62 between 1 and 1.5 times the cross sectional area of the arm portions 24 and 26.

Figure 5:
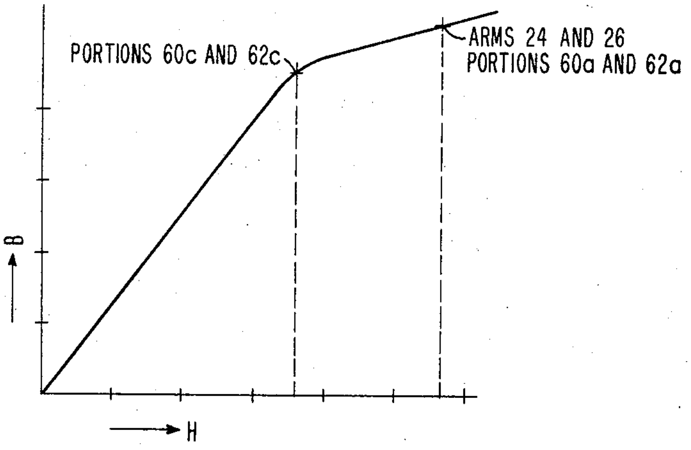
FIG. 5 is a B-H diagram of the material employed in the magnetic transducers.

Some typical dimensions for the described transducer are:

Gap 20—.25 mil wide x 72 mils long
Arms 24 and 26—6 mils wide x 4 mils long
Portions 60*a* and 62*a*—6 mils wide x 4 mils long
Portions 60*b* and 62*b*—20 mils wide x 100 mils long
Portions 60*c* and 62*c*—6.6 mils wide x 30 units long With the above dimensions, restricted portions 60*a* and 62*a* go into saturation simultaneously with the arms 24 and 26 and therefore as the magnetomotive force increases these portions add significant amounts of reluctance into the paths 40 and 42. If the flux density was to increase significantly beyond saturation in the restricted portions 60*a* and 62*a*, the flux would fringe out across portions 60*a* and 62*a*. To prevent this, portions 60*c* and 62*c* are provided to further limit the amount of flux in the paths 40 and 42 as the magnetomotive force between the third pole piece 28 and the first and second pole pieces 16 and 18 increases. These restricted portions 60*c* and 62*c* have a larger cross section than restricted portions 60a and 62a and are at the knee of the saturation curve when the restricted portions 60a and 62a and the arms 24 and 26 are in saturation. This is illustrated in FIG. 5. It can be seen from FIG. 5 that as the magnetic driving force is increased the flux density through sections 60c and 62c will not increase markedly and will thereby limit the flux flowing through circuits 40 and 42 so that significant fringing will not occur across restricted portions 60a and 62a.

While the invention has been particularly shown and described with reference to a preferred embodiment thereof, it will be understood by those skilled in the art that various changes in form and details may be made therein without departing from the spirit and scope of the invention.

I claim:

1. A magnetic head comprising first and second magnetic pole pieces separated from each other by a gap for the detection or recording of information on a magnetic media, a third magnetic pole piece with arm portions which span the gap and join the first and second magnetic pole pieces to the third magnetic pole piece at a point along the length of each said first and second pole pieces, an electric coil coupled to the third magnetic pole piece for the recording or detecting of information on a magnetic media with magnetic signals transmitted between the gap and the coil through the arms of the third magnetic pole piece, and magnetic source means for magnetically biasing said first and second magnetic pole pieces at one polarity and the third magnetic pole piece at the other polarity to set up a magnetic field on either side of the gap which passes through the arm portions of the third magnetic pole piece, said magnetic source means being variable to selectively drive the arm portions of the third magnetic pole piece either into saturation with a saturation field to magnetically isolate the electric coil from the gap or out of saturation to magnetically couple the electric coil to the gap, said first and second magnetic pole pieces each having, located on the opposite side of said point as the gap, automatically variable reluctance means for varying the reluctance of the pole piece to fields above the level at which the arms are saturated as a function of the magnitude of the saturating flux field, said automatically variable reluctance means comprising a portion of restricted magnetic permeability which is configured to be driven to the proximity of the knee on its saturation curve when the arms of the third pole piece go into saturation, and into saturation when the flux in the magnetic circuits on either side of the gap is greater than that necessary to saturate the arms of the third magnetic pole piece so as to increase the reluctance of said portion as a function of the flux passing therethrough whereby magnetic differentials across the gap are minimized so as to prevent the inadvertent erasure of signals on magnetic media.

2. The magnetic head of claim 1 wherein the first, second and third magnetic pole pieces are integrally formed of the same magnetic material and the portions of restricted permeability of the first and second pole pieces each have a cross sectional area which is at least as large as the cross sectional area of each of the arms of the third pole piece.

3. The magnetic head of claim 1 wherein the first, second, and third magnetic pole pieces are integrally formed of the same magnetic material and the portions of restricted permeability of the first and second pole pieces have a cross sectional area which is at least as large as the cross sectional area of each of the arms of the third pole piece.

4. The magnetic head of claim 3 wherein the cross sectional area of each face of the air gap is at least 10 times as large as the cross sectional area of each of the arms of the third pole piece.

5. The magnetic head of claim 3 wherein the portions of restricted permeabiilty of the first and second pole pieces vary in cross section area so that a first part of each said portion goes into saturation simultaneously with said arms and a second part of each said portion is substantially at the knee of its magnetic characteristic when the arms are in saturation.

6. A magnetic head comprising first and second magnetic pole pieces, each having a first and second end and being separated from each other at the first ends thereof by a gap for the detection or recording of information on a magnetic media, a third magnetic pole piece with arm portions which span the gap and join the first and second magnetic pole pieces to the third magnetic pole piece, an electric winding coupled to the third magnetic pole piece for the recording or detecting of information on a magnetic media with magnetic signals transmitted between the coil through the arms of the third magnetic pole piece, and magnetic source means for magnetically biasing said first and second magnetic pole pieces at one polarity and the third magnetic pole piece at the other polarity to set up a separate magnetic field on both sides of the gap which passes through one of the first or second pieces and one of the arm portions of the third magnetic pole piece on the particular side of the gap, said magnetic source means being variable to selectively drive the arm portions of the third magnetic pole piece either into saturation with a saturating field to magnetically isolate the magnetic coil from the gap or out of saturation to magnetically couple the electric coil to the gap, said first and second magnetic pole pieces each having automatically variable reluctance means for varying the reluctance of the pole piece to magnetic fields above the level at which the arms saturate as a function of the magnitude of the saturating flux fields thereby limiting magnetic differentials across the gap, said variable reluctance means being a portion of restricted magnetic permeability between the arms and said second ends thereof along the magnetic circuit passing therethrough, said portions of restricted permeability being shaped to be driven to the proximity of the knee on its saturation curve when the arms of the third pole piece go into saturation and being driven into saturation only when the flux passing therethrough is greater than that necessary to saturate the arms of the third magnetic pole piece so as to increase the reluctance of said portion as a function of the amount of flux passing therethrough to thereby decrease the magnitude of magnetic differentials across the gap so as to minimize the inadvertent erasure of signals on magnetic media by flux from said magnetic source means.

7. The magnetic head of claim 6 wherein the electric winding is in two coils which are oppositely wound about different arms of the third pole piece and is center tapped between the coils.

8. A null sweeping magnetic head comprising an array of side by side magnetic transducers separated from each other by magnetically insulating material, each said transducer having a first and second magnetic pole piece each having a first and second end and being separated from each other at the first ends thereof by a gap for the detecting or recording of information on a magnetic media, and having a third magnetic pole piece with arm portions which span the gap to join the first and second magnetic pole pieces to the third magnetic pole piece; an electric winding wrapped around all of the third magnetic pole pieces in the array of transducers for recording or detecting information on a magnetic media with magnetic signals transmitted between the gaps and the winding through the arms of the third magnetic pole pieces; and magnetic source means for magnetically biasing said first and second magnetic pole pieces of the transducers at one polarity and the third magnetic pole piece of the transducers at the other polarity to set up in each transducer a separate magnetic field on either side of the gap which passes through the one of the first or second pole pieces of the transducer on the particular side of the gap and the one of the arm portions of the third pole piece of the transducer on the particular side of the gap, said magnetic source means being variable to selectively drive the arm portions of the third magnetic pole piece of each transducer either into saturation to magnetically isolate with a saturating field the magnetic coil from the gap of the transducer or out of saturation to magnetically couple the electric coil to the gap of the transducer, said first and second magnetic pole pieces of each transducer each having between arms and said second ends thereof automatically variable reluctance means for varying the reluctance of the pole piece to flux fields above the level at which the arms are saturated as a function of the magnitudes of the saturating flux fields, said automatically variable reluctance means comprising a portion of restricted cross sectional area along the said magnetic circuit passing therethrough, said restricted cross sectional areas being dimensioned to be driven to the proximity of the knee on its saturation curve when the arms of the third magnetic pole piece go into saturation and to be driven into saturation only when the amount of flux passing therethrough is greater than that necessary to saturate the arms of the third magnetic pole piece to minimize the inadvertent erasure of signals recorded on a magnetic media.

9. The null sweeping head of claim 8 wherein the cross sectional area of each face of the air gap is at least 10 times as large as the cross sectional area of each of the arms of the third pole piece.

References Cited

UNITED STATES PATENTS

| | | | |
|---|---|---|---|
| 2,955,169 | 10/1960 | Stedtnitz | 179—100.2 |
| 3,175,049 | 3/1965 | Gabor | 340—174.1 |
| 3,164,682 | 1/1965 | Anderson | 179—100.2 |

TERRELL W. FEARS, *Primary Examiner.*

U.S. Cl. X.R.

179—100.2; 346—74